(12) United States Patent
Hsieh et al.

(10) Patent No.: US 8,769,245 B2
(45) Date of Patent: Jul. 1, 2014

(54) VERY LONG INSTRUCTION WORD (VLIW) PROCESSOR WITH POWER MANAGEMENT, AND APPARATUS AND METHOD OF POWER MANAGEMENT THEREFOR

(75) Inventors: Hsien-Ching Hsieh, New Taipei (TW); Po-Han Huang, Zhubei (TW); Shing-Wu Tung, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 677 days.

(21) Appl. No.: 13/112,307

(22) Filed: May 20, 2011

(65) Prior Publication Data

US 2012/0151192 A1    Jun. 14, 2012

(30) Foreign Application Priority Data

Dec. 9, 2010    (TW) ................................. 99143115 A

(51) Int. Cl.
*G06F 9/38* (2006.01)
*G06F 1/32* (2006.01)
*G06F 9/30* (2006.01)

(52) U.S. Cl.
CPC ............... *G06F 9/38* (2013.01); *G06F 9/3853* (2013.01); *G06F 9/3885* (2013.01); *G06F 1/3287* (2013.01); *G06F 1/3237* (2013.01); *G06F 9/30181* (2013.01)
USPC ........................................................ 712/24

(58) Field of Classification Search
CPC ....................................................... G06F 9/38
See application file for complete search history.

(56) References Cited

U.S. PATENT DOCUMENTS

| | | | |
|---|---|---|---|
| 5,958,044 A * | 9/1999 | Brown et al. .................. | 712/219 |
| 6,182,203 B1 | 1/2001 | Simar, Jr. et al. | |
| 6,195,756 B1 | 2/2001 | Hurd | |
| 6,219,796 B1 | 4/2001 | Bartley | |
| 6,442,701 B1 | 8/2002 | Hurd | |
| 6,535,984 B1 | 3/2003 | Hurd | |
| 6,748,020 B1 | 6/2004 | Eifrig et al. | |
| 6,859,870 B1 * | 2/2005 | Kim et al. ........................ | 712/24 |
| 6,865,662 B2 | 3/2005 | Wang | |

(Continued)

FOREIGN PATENT DOCUMENTS

| | | |
|---|---|---|
| TW | I233545 | 6/2005 |
| TW | 200602981 A | 1/2006 |
| TW | I275994 | 3/2007 |
| TW | I289785 | 11/2007 |

OTHER PUBLICATIONS

TW Office Action dated Jul. 29, 2013.

(Continued)

*Primary Examiner* — Eric Coleman
(74) *Attorney, Agent, or Firm* — McClure, Qualey & Rodack, LLP

(57) ABSTRACT

A very long instruction word (VLIW) processor and an apparatus with power management and a method of power management therefor are provided in consistent with the exemplary embodiments of the disclosure. The power management method includes the following steps. Valid instruction(s) and no operation (NOP) instruction(s) of an input instruction package are rearranged to output a transcoded instruction package, wherein the transcoded instruction package by the rearrangement has its NOP instruction(s) corresponding to at least one execution unit, which is to be placed in power reduction state, of a VLIW processor. Power reduction control is selectively performed on at least one execution unit corresponding to at least one NOP instruction of the transcoded instruction package according to the transcoded instruction package.

34 Claims, 9 Drawing Sheets

(56) References Cited

U.S. PATENT DOCUMENTS

| | | |
|---|---|---|
| 7,107,471 B2 | 9/2006 | Feierbach |
| 7,290,122 B2 | 10/2007 | May et al. |
| 7,299,369 B2 | 11/2007 | Webster et al. |
| 7,412,591 B2 * | 8/2008 | Ma et al. .................. 712/229 |
| 7,500,126 B2 | 3/2009 | Terechko et al. |
| 7,546,476 B2 | 6/2009 | Webster et al. |
| 7,552,313 B2 | 6/2009 | Tabei |
| 2005/0050300 A1 | 3/2005 | May et al. |
| 2006/0156004 A1 | 7/2006 | Alba Pinto et al. |
| 2008/0307240 A1 | 12/2008 | Dahan et al. |
| 2009/0049276 A1 * | 2/2009 | Bergland et al. ............ 712/24 |
| 2010/0199068 A1 | 8/2010 | Egger et al. |

OTHER PUBLICATIONS

Gupta, M., et al.; "CSMT: Simultaneous Multithreading for Clustered VLIW Processors;" IEEE Transactions on Computers; vol. 59; No. 3; Mar. 2010; pp. 385-399.

Sun, M., et al.; "An Efficient Parallel Instruction Execution Method for VLIW DSP;" Aug. 2010; pp. 75-78.

Kobayshi, K., et al.; "A Resource-Shared VLIW Processor Architecture for Area-Efficient On-Chip Multiprocessing;" IEEE; 2005; pp. 619-622.

Shimajiri, H., et al.; "A Method of Speculative Dual-Path Execution for VLIW Processors;" IEEE; 2004; pp. 195-198.

Gass, W.; "Higher Performance and Lower Power Enhancements to VLIW Architectures;" IEEE; 2001; pp. 157.

* cited by examiner

VERY LONG INSTRUCTION WORD (VLIW) PROCESSOR WITH POWER MANAGEMENT, AND APPARATUS AND METHOD OF POWER MANAGEMENT THEREFOR This application claims the benefit of Taiwan application Serial No. 99143115, filed Dec. 9, 2010, the subject matter of which is incorporated herein by reference.

TECHNICAL FIELD

The disclosure relates in general to a power management technology for a very long instruction word (VLIW) processor, and to a VLIW processor and apparatus with power management and a method of power management therefor.

BACKGROUND

The very long instruction word (VLIW) processor is a central processing unit with instruction level parallel architecture. The VLIW processor executes operating instruction(s) scheduled during program compiling in a parallel manner. Since the execution sequence of the operating instructions is already determined by the compiler, such processor can process the correlation situation between the program instructions without using scheduled hardware. Thus, the VLIW processor provides excellent computation efficiency when the hardware complexity is low, and the complexity of corresponding compiler increases.

In terms of electronic devices such as portable or mobile device, the above processor can reduce the overall hardware complexity and cost, and increase the efficiency. Therefore, how to adapt the VLIW processor to electronic products to meet the restrictions in the application of electronic products, and further resolve situations such as scarcity in computation and power resource has become a prominent task to the industry.

SUMMARY

The disclosure is directed to an exemplary embodiment of a very long instruction word (VLIW) processor and an apparatus with power management and a method of power management therefor. An exemplary embodiment of a power management method is used in the VLIW processor for performing a transcoding process on the instruction package to separate valid instruction(s) and no operation (NOP) instruction(s) of the instruction package and to position the same type of instructions around a position and further performs power reduction control on the execution unit corresponding to the NOP instruction(s) of the VLIW processor.

The disclosure provides an exemplary embodiment of a power management apparatus used in a VLIW processor. The power management apparatus includes an instruction transcoder and a power reduction controller. The instruction transcoder rearranges valid instruction(s) and NOP instruction(s) of an input instruction package to output a transcoded instruction package, wherein the transcoded instruction package by the rearrangement has its NOP instruction(s) corresponding to at least one execution unit, which is to be placed in power reduction state, of a VLIW processor. The power reduction controller selectively performs power reduction control on at least one execution unit corresponding to at least one NOP instruction of the transcoded instruction package according to the transcoded instruction package.

The disclosure provides an exemplary embodiment of a power management method for use in a VLIW processor. The power management method includes the following steps. Valid instruction(s) and NOP instruction(s) of an input instruction package are rearranged to output a transcoded instruction package, wherein the transcoded instruction package by the rearrangement has its NOP instruction(s) corresponding to at least one execution unit, which is to be placed in power reduction state, of a VLIW processor. Power reduction control is selectively performed on at least one execution unit corresponding to at least one NOP instruction of the transcoded instruction package according to the transcoded instruction package.

The disclosure provides an exemplary embodiment of a VLIW processor with power management. The VLIW processor includes a read operand stage, a plurality of execution units, an instruction transcoder, and a power reduction controller. The read operand stage is coupled between the instruction transcoder and the execution units. The instruction transcoder rearranges valid instruction(s) and NOP instruction(s) of an input instruction package to output a transcoded instruction package, which is executed by the execution units. The transcoded instruction package by the rearrangement has its NOP instruction(s) corresponding to at least one of the execution units, wherein the at least one execution unit is to be placed in power reduction state. The power reduction controller selectively performs power reduction control on at least one execution unit corresponding to at least one NOP instruction of the transcoded instruction package according to the transcoded instruction package.

The disclosure will become better understood with regard to the following detailed description of the non-limiting embodiment(s). The following description is made with reference to the accompanying drawings.

DETAILED DESCRIPTION

In the disclosure below, exemplary embodiments of a VLIW processor with power management, an apparatus, and a method of power management therefor are provided.

Figure 1A:
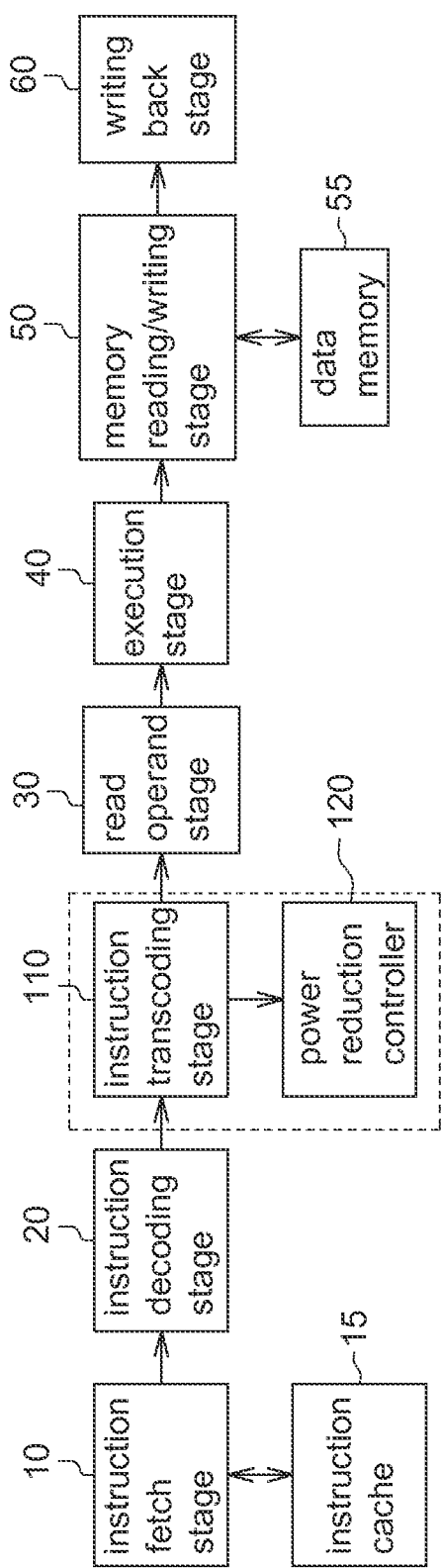
FIG. 1A shows a pipeline architecture of a VLIW processor according to an exemplary embodiment.

FIG. 1A shows a pipeline architecture of a VLIW processor according to an exemplary embodiment, with an exemplary embodiment of an instruction transcoder. As illustrated in FIG. 1A, the instruction fetch stage 10 accesses an instruction cache 15 and transmits instructions to an instruction decoding stage 20, and an instruction transcoding stage 110 is disposed between the instruction decoding stage 20 and a read operand stage 30. In the instruction transcoding stage 110, no operation (NOP) instruction(s) of an input instruction package is rearranged to correspond to some execution units of the VLIW processor, and a transcoded instruction package is outputted. The power reduction controller 120 performs power reduction control on the execution units corresponding to the NOP instruction(s) of the transcoded instruction package according to the result outputted from the instruction transcoding stage 110. In other words, in the embodiment of the pipeline architecture of FIG. 1A, the power consumption in the execution stage 40, the memory reading/writing stage 50, and the writing back stage 60 that correspond to the NOP instruction(s) can all be reduced.

A VLIW processor with power management can be designed on the basis of the pipeline architecture of the VLIW processor of FIG. 1A, and the operation of the VLIW processor with power management is elaborated in an exemplary embodiment below.

Figure 1B:
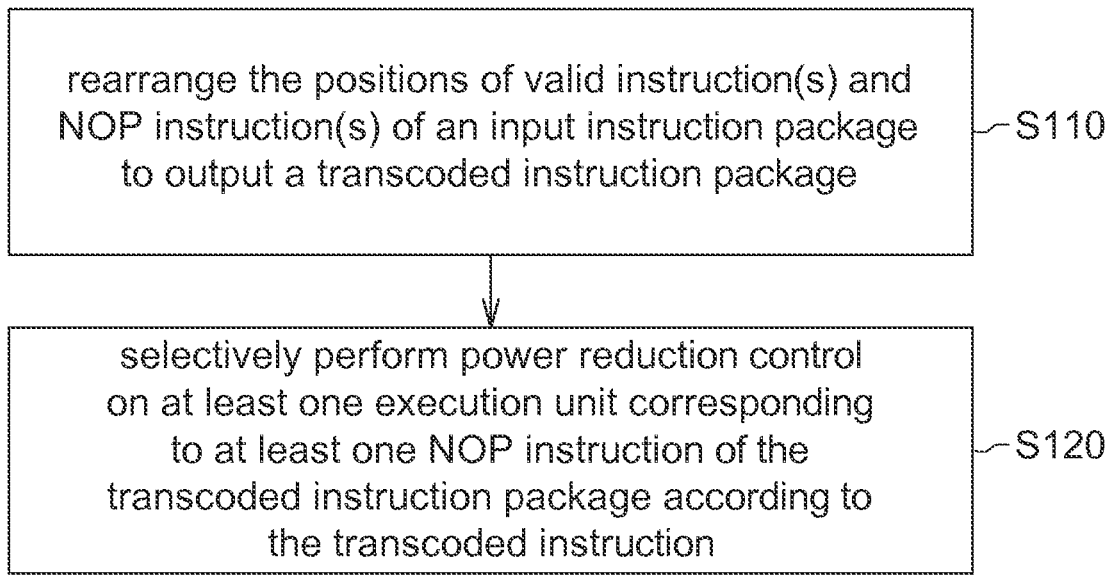
FIG. 1B shows an exemplary embodiment of a power management method based on the VLIW processor of FIG. 1A.

FIG. 1B shows an exemplary embodiment of a power management method based on the VLIW processor of FIG. 1A. The method begins at step S110, the relationship between the positions of the valid instruction(s) and NOP instruction(s) of an input instruction package is analyzed or checked and the positions of the valid instruction(s) and NOP instruction(s) are rearranged to output a transcoded instruction package, wherein the transcoded instruction package by the rearrangement has its NOP instruction(s) corresponds to at least one execution unit of the VLIW processor, and the at least one execution unit is to be placed in power reduction state. As indicated in step S120, power reduction control is selectively performed on the at least one execution unit corresponding to the NOP instruction(s) of the transcoded instruction package according to the output result of the instruction transcoding.

Figure 2:
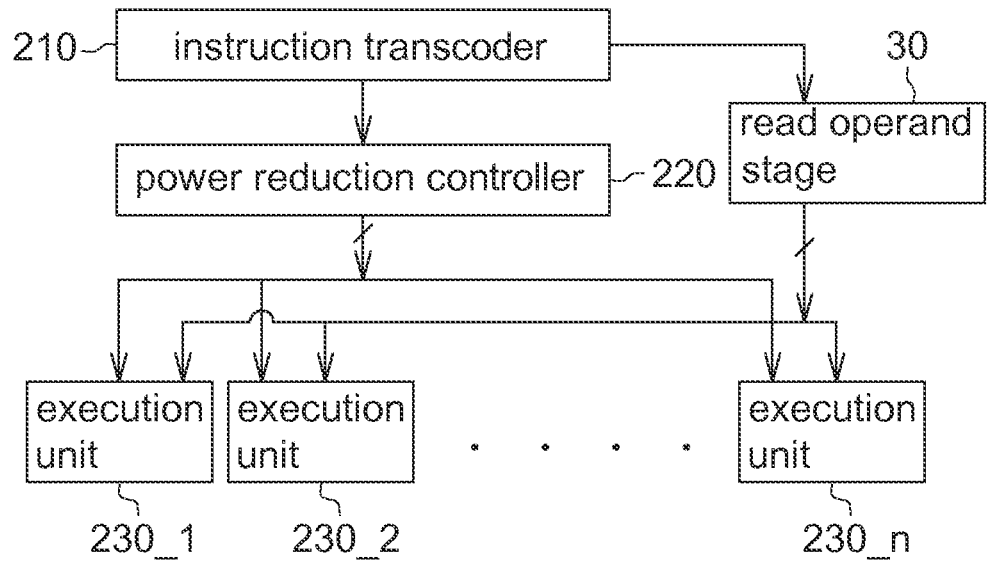
FIG. 2 shows a power management apparatus of a VLIW processor according to an exemplary embodiment.

To implement the power management method disclosed above, a power management apparatus of the VLIW processor illustrated in the embodiment of FIG. 2 includes an instruction transcoder 210 and a power reduction controller 220. The instruction transcoder 210 transcodes an input instruction package IP0 to output a transcoded instruction package IP1 to the execution units 230_1-230_n of the VLIW processor via a read operand stage 30, wherein the transcoded instruction package IP1 is executed by the execution units 230_1 to 230_n, and n>1.

The instruction package includes a number of instructions, which can be expressed as {INS1|INS2|INS3| ... INSn}. For example, INS3 denotes the third instruction, and the n instructions are respectively executed by n execution units. In terms of logic, the n instructions are respectively and sequentially assigned to n instruction slots, and each instruction slot has its corresponding execution unit. Let an instruction package IP0={ADD|NOP|NOP|SUB|ADD} which has five instruction slots be taken for example. The instruction package IP0 has 2 NOP instructions, and 3 valid instructions, wherein ADD and SUB respectively are the abbreviation of an addition operation and a subtraction operation, and for convenience of elaboration, the operators are omitted.

In an exemplary embodiment, the instruction transcoder 210 can be designed in a manner that the NOP instructions are positioned around the rightmost execution unit of FIG. 2, and the valid Instructions are thus shifted to the left. In the case of the above example:
IP0={ADD|NOP|NOP|SUB|ADD} is transcoded as:
IP1={ADD|SUB|ADD|NOP|NOP}.

Suppose NOP instruction(s) often occurs to the instruction package executed by the VLIW processor. The power reduction controller 220 can perform power reduction control on the rightmost execution units 203_4 and 203_5 according to the result of the instruction package IP1 transcoded by the instruction transcoder 210, wherein n=5. The instruction transcoder 110 outputs, for example, instruction validation information indicating whether each instruction slot of the instruction package IP1 is a valid instruction or an NOP instruction, so that the power reduction controller 220 determines whether to perform power reduction control accordingly. For example, instruction validation information for the instruction package IP1 may be denoted by {1|1|1|0|0}, wherein each instruction slot is denoted by one bit, that is, 0 or 1, and 0 denotes an NOP instruction, and 1 denotes a valid instruction. It is certain that the instruction validation information can also be denoted in other manners. For example, each instruction slot can be denoted by one bit or other forms of designation.

The power reduction controller 220 determines whether to perform power reduction control on some execution units of a VLIW processor selectively according to instruction validation information. The power reduction control is performed by, for example, selectively controlling the clock provided to the execution unit or selectively reducing the operating voltage of the execution unit.

Figure 3:
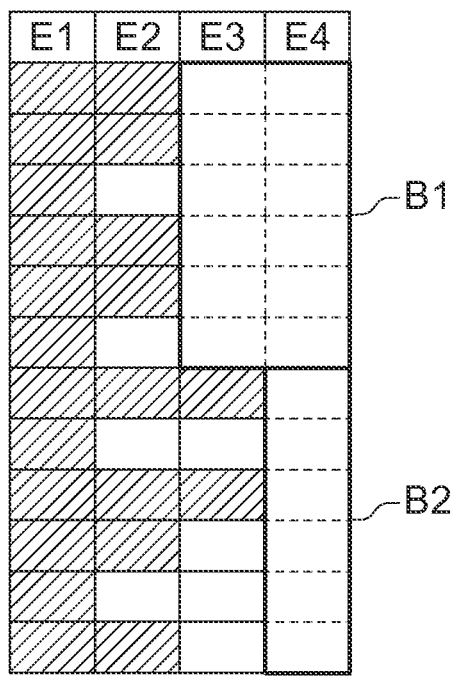
FIG. 3 shows an exemplary embodiment of a processing procedure of a transcoded instruction package for a VLIW processor with four execution units.

The power reduction controller 220 can be realized by a clock gating controller for selectively controlling the clock provided to an execution unit. Following the above embodiment, the NOP instructions of the instruction package outputted from the instruction transcoder 210 are assigned to the right-hand-side instruction slots as illustrated in FIG. 3, wherein different valid instructions are indicated by slashed squares, and E1-E4 respectively correspond to four execution units such as the execution units 230_1 to 230_4 of FIG. 2 with n=4. The clock gating controller, according to instruction validation information, enables the execution units E3 and E4 to be clock locked in the cycles corresponding to block B1 of FIG. 3, and enables the execution unit E4 to be clock locked in the cycles corresponding to block B2 of FIG. 3. The clock gating controller and related controllers can be realized according to, for example, various conventional clock gating logic circuits, or other principles as disclosed in FIG. 1A.

In yet another embodiment, the power reduction controller 220 can be realized by a voltage controller, which selectively controls an operating voltage provided to an execution unit. The voltage controller, according to instruction validation information, reduces the operating voltage received by the execution units E3 and E4 in the cycles corresponding to block B1 of FIG. 3, and reduces the operating voltage received by the execution unit E4 in the cycles corresponding to block B2. Meanwhile, the operating voltages for the other execution units maintain the original voltage level. With respect to some execution units, the NOP instruction(s) can be executed at a lower voltage level, or the power can even be turned off. Turning the power off is an exemplary embodiment of reducing the voltage to the minimum. In another embodiment, it can be designed that the standby current can maintain at a certain level to maintain the internal state unchanged when the voltage is reduced.

In the embodiments of reducing power consumption by reducing or turning off the voltage, since it takes time to turn on/off the power, time overhead will thus occur. Thus, for resumption of the execution unit, all computations should pause immediately and the operation will not be resumed until the voltage is again at an operating level. Consequently, the execution time will be prolonged and the efficiency will be affected accordingly.

Therefore, in an exemplary embodiment, the number of consecutive NOP instructions is accumulated, and when the accumulated number is larger than or equal to a threshold value, the execution unit enters a power saving state and the voltage of related execution unit is turned off or reduced. Assume that the threshold value equal 3 in the example of FIG. 4A. After block B3 shows that the NOP instruction(s) occurs for 3 consecutive cycles, block B4 indicates that the execution units E3 and E4 enter the power saving state. Following block B4, since all of the execution units E1-E4 have to execute valid instruction(s), the execution units E3 and E4 maintain the original level of operating voltage. To assure that the valid instruction(s) executed by the execution units E3 and E4 can smoothly go through the subsequent pipeline stages, in the 4 cycles of block B5, the original level of operating voltage must be maintained. When block B5 indicates that the NOP instruction(s) occurs for 4 consecutive cycles being larger than the threshold value (that is, 3), the execution units E3 and E4 enter the power saving state again.

Figure 4A:
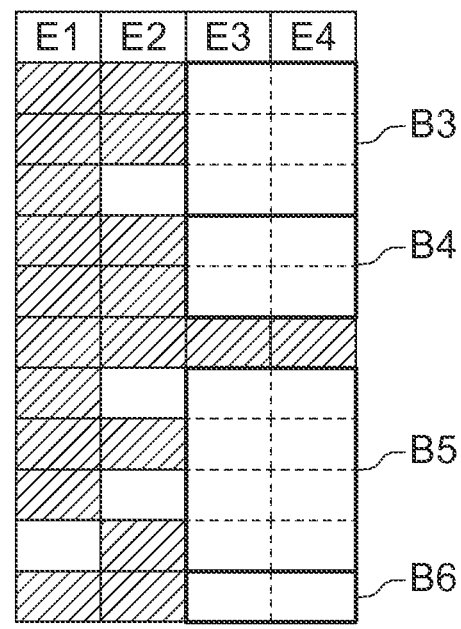
FIG. 4A shows another exemplary embodiment of a processing procedure of a transcoded instruction package.
Figure 4B:
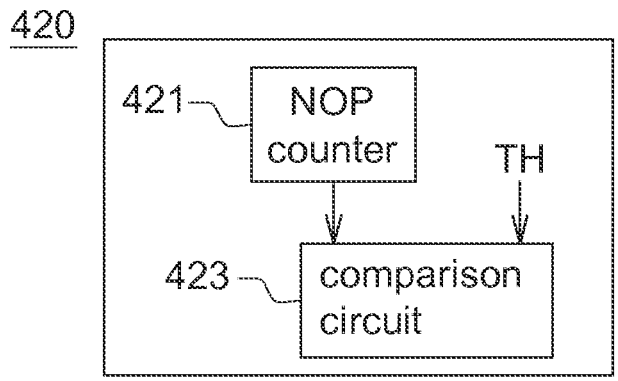
FIG. 4B shows an exemplary embodiment of a voltage controller.

FIG. 4B shows an exemplary embodiment of a voltage controller 420, which includes an NOP counter 421 and a comparison circuit 423. The comparison circuit 423 compares the number of NOP instructions occurring at some instruction slots (such as the number of consecutive occurrences of the NOP instructions corresponding to the execution units E3 and E4) to a threshold value TH to determine whether to instruct other circuits (such as power management circuit or switch element) for enabling the execution units E3 and E4 to enter the power saving state, wherein the number of NOP instructions is accumulated by the NOP counter. Besides, the threshold value can be determined by the user such as by way of setting a register for example.

Figure 5A:
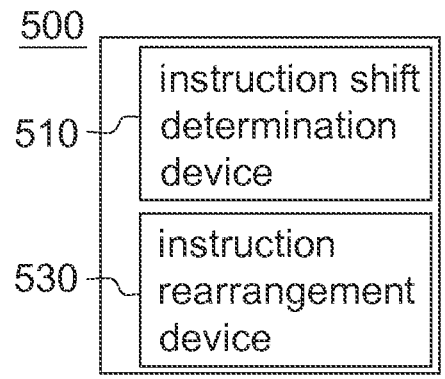
FIG. 5A shows a block diagram of an exemplary embodiment of an instruction transcoder.

The following disclosure further provides other implementations of the instruction transcoder 210 of the above power management apparatus. As indicated in FIG. 5A, the instruction transcoder 500 includes an instruction shift determination device 510 and an instruction rearrangement device 530. The instruction shift determination device 510 analyzes or checks the relationship between the positions of the valid instruction(s) and NOP instruction(s) of an input instruction package to generate instruction shift information. The instruction rearrangement device 530, according to the instruction shift information, rearranges the positions of the valid instruction(s) and NOP instruction(s) for positioning the NOP instructions around and corresponding to some execution units of the VLIW processor, so as to output a transcoded instruction package.

Figure 5B:
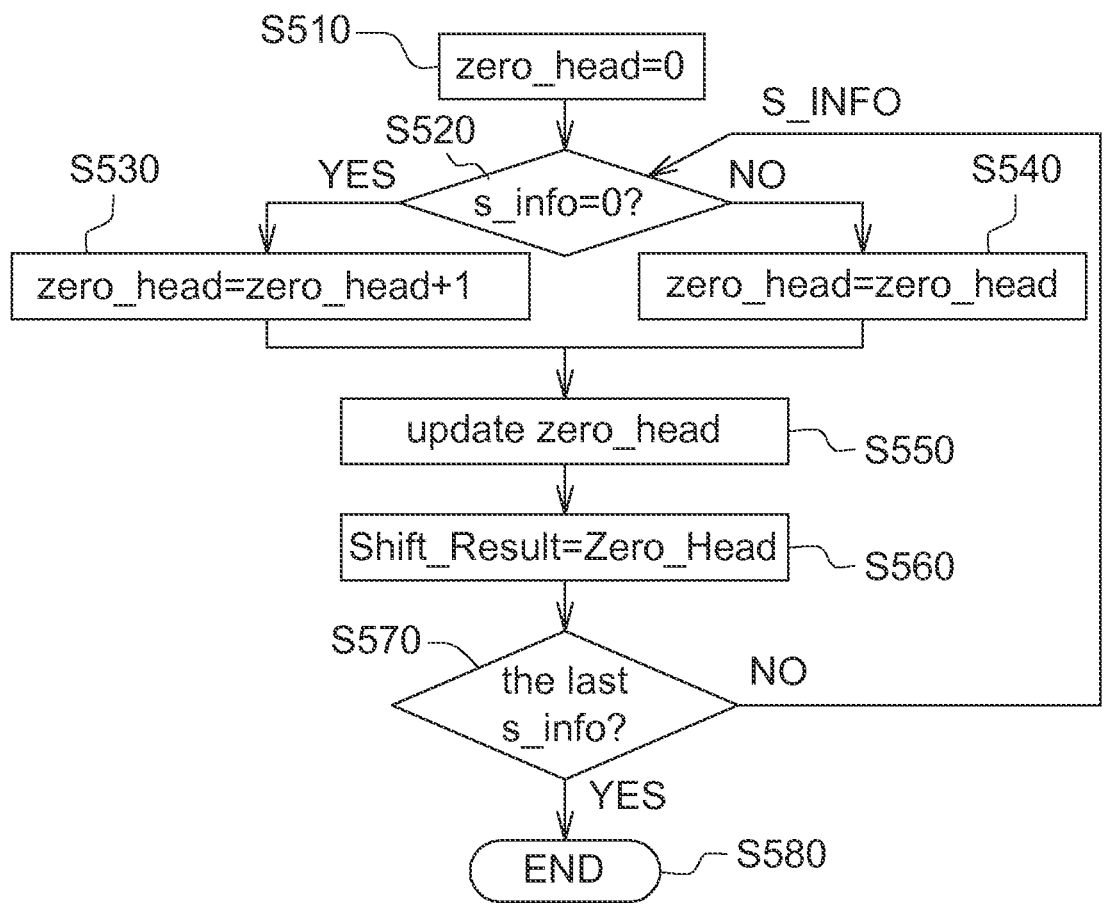
FIG. 5B shows a flowchart of an exemplary embodiment of an instruction shift determination method.

FIG. 5B shows a flowchart of an exemplary embodiment of an instruction shift determination method, which can be used in different embodiments for positioning the NOP instructions of the instruction package around (or towards) the left, the right, the middle or the two sides. The instruction shift determination device 510 can be used for implementing the method of FIG. 5B. First of all, some definitions are defined below. In the above example, the values of the instruction validation information such as {1|1|1|0|0} are referred to as the valid bits of the instruction package, and the least significant bit and the most significant bit are respectively defined as the least significant bit (LSB) and the most significant bit (MSB) of the valid bits, which are respectively 0 and 1 in the present example. The instruction shift determination method analyzes or checks the relationship between the positions of 0 and 1 of the valid bits, and further generates the shift result (or abbreviated as S_R) of each instruction of the instruction package for execution of instruction shift.

The instruction shift determination method includes the following steps. Firstly, the method begins at step S510 to set the initial value of Zero_Head to 0. Each of the valid bits of an instruction package are referred to as instruction slot information and abbreviated as S_INFO. In step S520, whether the instruction slot information equals 0 is determined in sequence. If instruction slot information equals 0, this indicates that the instruction in the instruction slot is an NOP instruction, and the method proceeds to step S530, the value of Zero_Head is added by 1, and this implies that there is one NOP instruction prior to the occurrence of the first valid instruction (the instruction slot information equals 1). If the instruction slot information equals 1, this implies that the instruction in the instruction slot is a valid instruction, and the method proceeds to step S540, the value of Zero_Head is maintained. Then, the method proceed to step S550, the value of the Zero_Head is updated according to the above result. Then, the method proceeds to step S560, the value of Zero_Head is sent out and used as the value of the corresponding shift result Shift Result of the instruction slot. As shown in step 570, it is checked whether the instruction slot information is the last instruction slot information. If the instruction slot information is not the last instruction slot information, the method repeats from step S520 until the input of the instruction slot information finishes. If the instruction slot information is the last instruction slot information, then the method proceeds to step S580, the instruction shift determination method terminates.

Figure 6:
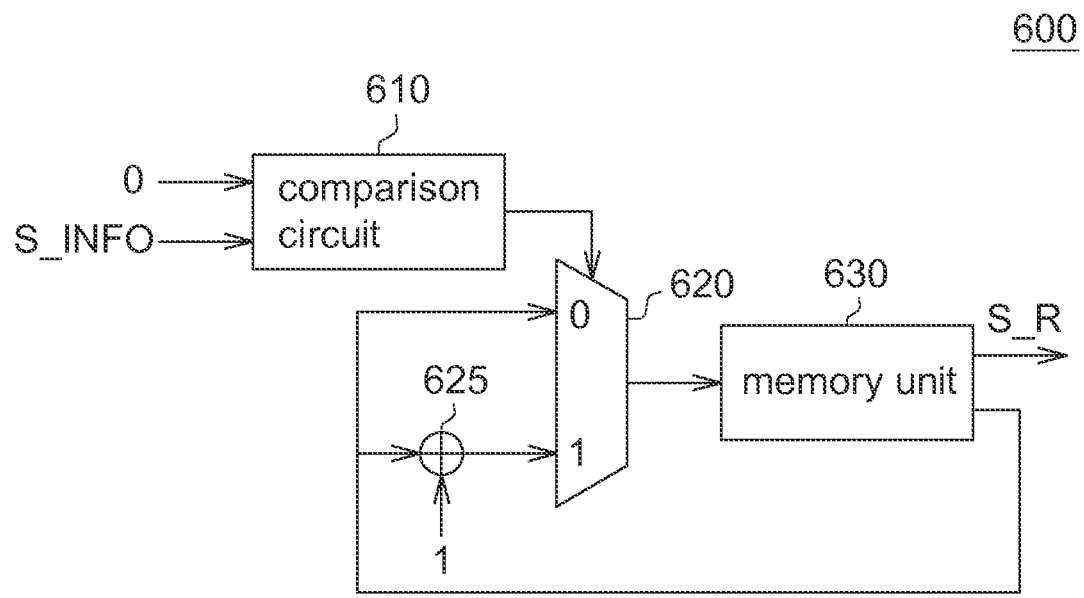
FIG. 6 shows a block diagram of an exemplary embodiment of an instruction shift determination circuit implementing the method of FIG. 5B.

FIG. 6 shows a block diagram of an exemplary embodiment of an instruction shift determination circuit implementing the method of FIG. 5B. The instruction shift determination circuit 600 includes a comparison circuit 610, a multiplexer 620, an adder 625, and a memory unit 630. The comparison circuit 610 is for implementing step S520, and the multiplexer 620 and the adder 625 and the memory unit 630 are for implementing steps Different embodiments of positioning the NOP instructions of the instruction package around the left, the right, the middle and the two sides are exemplified below with FIG. 5B, wherein each embodiment can be implemented by the method of FIG. 5B and the circuit embodiment of FIG. 6.

Embodiments of Shifting NOP Instruction(s) to the Right:

Firstly, an exemplary embodiment of shifting NOP instruction(s) to the right is taken for example. In the example of {1|0|0|1|1|0}, if NOP instruction(s) is to be shifted to the right (the valid instruction(s) is shifted to the left), then the most significant bit (MSB) is used as the first input instruction slot information, and the input sequence is: 1=>0=>0=>1=>1=>0. All corresponding shift results S_R can be generated according to the flowchart of FIG. 5B for the circuit which calculates the displacement to execute the instruction shift.

According to the above order, the bits of the valid bits are sequentially inputted to the instruction shift determination circuit 600, which generates the corresponding shift results S_R according to the method of FIG. 5B. In the first input, the information of the instruction slot 1 equals 1, so the value of Zero_Head remains as 0. In the second input, the information of the instruction slot 2 equals 0, so the value of Zero_Head is added by 1, and the result of the value of Zero_Head equals 1. In the third input, the information of the instruction slot 3 equals 0, so the value of Zero_Head is added by 1, and the result of the value of Zero_Head equals 2. In the fourth input, the information of the instruction slot 4 equals 1, so the value of Zero_Head remains equals 2, and the result of the value of Zero_Head equals 2. In the fifth input, the information of the instruction slot 5 equals 1, so the value of Zero_Head remains equal to 2, and the result of the value of Zero_Head equals 2. In the sixth input, the information of the instruction slot 6 equals 0, so the value of Zero_Head is added by 1, and the result of the value of Zero_Head equals 3. Thus, the corresponding shift results S_R of the instruction slots 1-6 are respectively: [0, 1, 2, 2, 2, 3].

The instruction shift can be performed after the value of the shift result S_R of each instruction slot is obtained. For example, in the instruction slot 1, the instruction slot information equals 1, which indicates that the instruction is a valid instruction. Since the instruction slot 1 is already the first instruction slot, and the value of the shift result S_R equals 0, there is no need to perform shifting (denoted by DM which means "Don't Move"). In the instruction slot 2, the instruction slot information equals 0, so the instruction is an NOP instruction. Since the value of the shift result S_R equals 1, which indicates that the instruction slot 2 is an NOP instruction, there is no need to consider shifting (denoted by DC which means "Don't Care"). The situation of the instruction slot 3 is similar to that of the instruction slot 2, so there is no need to consider shifting either. In the instruction slot 4, the instruction slot information equals 1, which indicates that the instruction is a valid instruction. Since the value of the shift result S_R equals 2, the instruction in the instruction slot 4 must be shifted to the left by 2 instruction slots and is thus placed in the instruction slot 2, and the vacancy left by the instruction slot 4 is occupied by an NOP instruction. In the instruction slot 5, the instruction slot information equals 1, which indicates that the instruction is a valid instruction. Since the value of the shift result S_R equals 2, the instruction in the instruction slot 5 must be shifted to the left by 2 instruction slots and is thus placed in the instruction slot 3, and the vacancy left by the instruction slot 5 is occupied by an NOP instruction.

Lastly, the instruction slot 6 is similar to the instruction slot 2, and there is no need to consider shifting. In the above example, two parameters {S_NUM, S_NUM-S_R} are generated through the calculation of shifting. One parameter S_NUM refers to an instruction slot from which the valid instruction(s) is shifted, and the other parameter S_NUM-S_R refers to an instruction slot in which the shifted valid instruction(s) is placed. That is, the instruction(s) of the instruction slot S_NUM is shifted to the instruction slot S_NUM-S_R, wherein the parameter S_NUM-S_R denotes the result of deducting the number S_R from the number S_NUM.

According to the above example, the corresponding shift relationship can be interpreted and denoted as: [DM, DC, DC, SL_2, SL_2, DC], wherein the abbreviations DM and DC respectively denote "Don't Move" and "Don't Care", and SL_k (or SR_k) denotes being shifted to the left (or to the right) by k instruction slots. Thus, the instruction rearrangement device 530, according to the above shift result S_R and the above rules, can shift the NOP instruction(s) of the input instruction package to the right by a logic circuit, and the corresponding valid bits of the instruction package generated after shifting are: {1|1|1|0|0|0}.

Embodiment of Shifting NOP Instruction(s) to the Left:

In the example of {1|0|0|1|1|0}, if NOP Instruction(s) is to be shifted to the left (the valid instruction(s) is shifted to the right), then the least significant bit (LSB) is used as the first input instruction slot information, and the input sequence is: 0=>1=>1=>0=>0=>1. Thus, the corresponding shift result S_R of the instruction slots 6 to 1 respectively are: 3, 3, 2, 1, 1, 1, wherein the numbers of the instruction slot are counted from the right to the left, and the corresponding shift relationship can be interpreted as: SR_3, DC, DC, SR_1, SR_1, DC. Thus, the instruction rearrangement device 530 can shift the NOP instruction(s) of the input instruction package to the left according to the above the shift result S_R, and the corresponding valid bits of the instruction package generated after shifting are: {0|0|0|1|1|1}.

Embodiment of Shifting NOP Instruction(s) to the Middle:

In the example of {1|0|0|1|1|0}, if NOP Instruction(s) is to be shifted to the middle (the valid P Instruction(s) is shifted to the two sides), then the instruction package is divided into two halves, and the most significant bit (MSB) of the left half is used as a first input instruction slot information of the left half. The least significant bit (LSB) of the right half is used as a first input instruction slot information of the right half. Suppose the valid bits {1|0|0|1|1|0} of the instruction package are divided into a left half {1|0|0} and a right half {1|1|0}. For the left half of the valid bits, the input sequence is: 1=>0=>0; for the right half, the input sequence is: 0=>1=>1. When the method of FIG. 5B is performed on the left half, the generated corresponding shift result S_R is: [0, 1, 2], the corresponding shift relationship can be interpreted as: [DM, DC, DC], and the valid bits corresponding to the instruction package generated from the left half of the instruction package after shifting are: {1|0|0}. When the method of FIG. 5B is applied to the right half, the generated corresponding shift result S_R is: [1, 1, 1], the corresponding shift relationship can be interpreted as: [SR_1, SR_1, DC]; and the valid bits corresponding to the instruction package generated from the right half of the instruction package after shifting are: {0|1|1}. Lastly, the instruction packages of the two halves after shifting can be combined to obtain a transcoded instruction package whose corresponding valid bits are: {1|0|0|0|1|1}.

Embodiment of Shifting NOP Instruction(s) to the Two Sides:

In the example of {1|0|0|1|1|0}, if NOP Instruction(s) is to be shifted to the two sides (the valid instruction(s) is shifted to the middle), then the instruction package is divided into two halves, the least significant bit (LSB) of the left half is used as a first input instruction slot information of the left half, and the most significant bit (MSB) of the right half is used as a first input instruction slot information of the right half. Suppose the valid bits {1|0|0|1|1|0} of the instruction package are divided into {1|0|0} and {1|1|0}. For the left half of the valid bits, the input sequence is: 0=>0=>1; for the right half, the input sequence is: 1=>1=>0. When the method of FIG. 5B is performed on the left half, the generated corresponding shift result S_R is: [2, 2, 1], the corresponding shift relationship can be interpreted as: [SR_2, DC, DC], and the valid bits corresponding to the instruction package generated from the left half of the instruction package after shifting are: {0|0|1}. When the method of FIG. 5B is applied to the right half, the generated corresponding shift result S_R is: [0, 0, 1], the corresponding shift relationship can be interpreted as: [DM, DM, DC]; and the valid bits corresponding to the instruction package generated from the right half of the instruction package after shifting are: {1|1|0}. Lastly, the instruction packages of the two halves after shifting can be combined to obtain a transcoded instruction package whose corresponding valid bits are: {0|0|1|1|1|0}.

Suppose one instruction package has n instruction slots, but n is not divisible by 2, then the quotient (m) of n/2 is rounded up, the value of m is used as a basis for dividing the instruction package, and the most significant bit (MSB) is used as the initial bit and counts for m bits towards the least significant bit (LSB). In the example of an instruction package with five instruction slots, n=5, n/2=2.5, and m=3. Thus, m is used as a basis for dividing the instruction package, and the most significant bit (MSB) is used as the initial bit and counts for 3 bits towards the least significant bit (LSB). The valid bits of the input instruction package being {0|1|0|1|0} can be divided into the left half {0|1|0} and the right half {1|0}. Thus, any instruction package can be divided into a left half and a right half, and the two halves are processed according to whether the NOP instruction(s) is to be shifted to the middle or to the two sides. The details of processing are exemplified in the above examples and are not repeated here.

Other Scenarios of Transcoding:

During the above process of transcoding instruction, register conflict may occur. Suppose two consecutive instruction packages, namely, the instruction package 1 and the instruction package 2, respectively expressed as:
{ADD R0,R1,R2|SUB R8,R9,R10|NOP|NOP|NOP}
{ADD R3,R4,R5|NOP|NOP|SUB R8,R9,R10|NOP}
are transcoded as:
{ADD R0,R1,R2|SUB R8,R9,R10|NOP|NOP|NOP}
{ADD R3,R4,R5|SUB R8,R9,R10|NOP|NOP|NOP}.

The register conflict situation is elaborated below. The instruction slot 2 of the instruction package 1 uses the registers R8, R9, and R10. The instruction slot 2 of the transcoded instruction package 2 also uses the registers R8, R9, and R10, so the register of register file RF2 of the execution unit 2 should not be used directly lest computation errors might occur.

The above scenarios can be resolved by appropriately switching the input and output of the register file. A corresponding register file of the original instruction slot is assigned to be used by the instructions of the current instruction slot that may cause register conflict. For the above example, the instruction slot 2 of the transcoded instruction package 2 should use the registers R8, R9, and R10 belonging to the register file RF4 of the execution unit 4 (instruction slot 4) before transcoding. When the above situation occurs, the VLIW processor, according to two parameter {S_NUM, S_NUM-S_R} of the instruction slot, controls from which instruction slot the address input signal is inputted to the register file, and to which execution unit the read data is sent out.

Figure 7A:
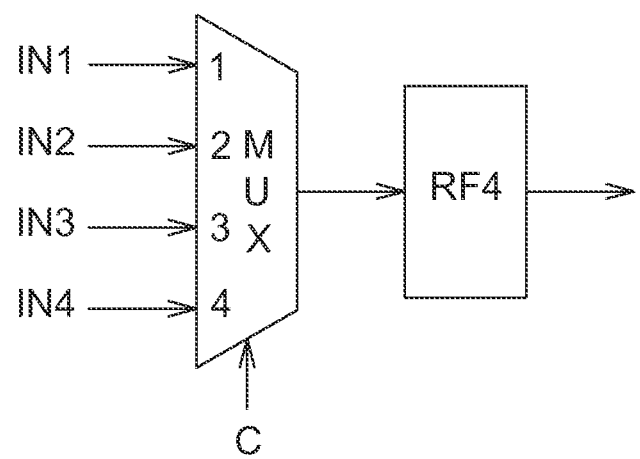
FIG. 7A shows an exemplary embodiment in which a multiplexer is coupled to a register file before the address input signal terminal of the register file.

As indicated in FIG. 7A, a multiplexer MUX is coupled before the address input signal of a register file such as the register file RF4 corresponding to the instruction slot 4, wherein the multiplexer receives the address and data (represented by inputs IN1-IN3) corresponding to the instruction slot 1-3 in addition to the address and data (represented by an input IN4) corresponding to the instruction slot 4. When the above situation occurs, the two parameters of the instruction slot 2 of the transcoded instruction package 2 are: {4, 2}, so that the register file RF4 is used according to the instruction slot number S_SUM, and the corresponding multiplexer MUX is controlled to read an address input signal from the instruction slot 2 (that is, the input IN2) according to the parameter S_NUM-S_R.

Then, the data read from the register file RF4 is transmitted to the execution unit 2 according to the parameter S_NUM-S_R. The above transmission can be implemented by coupling a switch circuit, including such as a multiplexer or a de-multiplexer, between the data output signal terminal of the register file RF4 (or other register file) and the execution unit. The switch circuit outputs the data read from the register file RF4 corresponding to the instruction slot number S_SUM (such as 4) to the execution unit 2 corresponding to the parameter S_NUM-S_R (such as 2) according to two parameters {S_NUM, S_NUM-S_R} used as a control signal.

In the above exemplification, the operation of appropriately switching the input and output of a register file can be implemented by a control circuit, such as a decoder, which controls the switch circuit coupled between the input and output of the register file according to two parameters {S_NUM, S_NUM-S_R}.

Figure 7B:
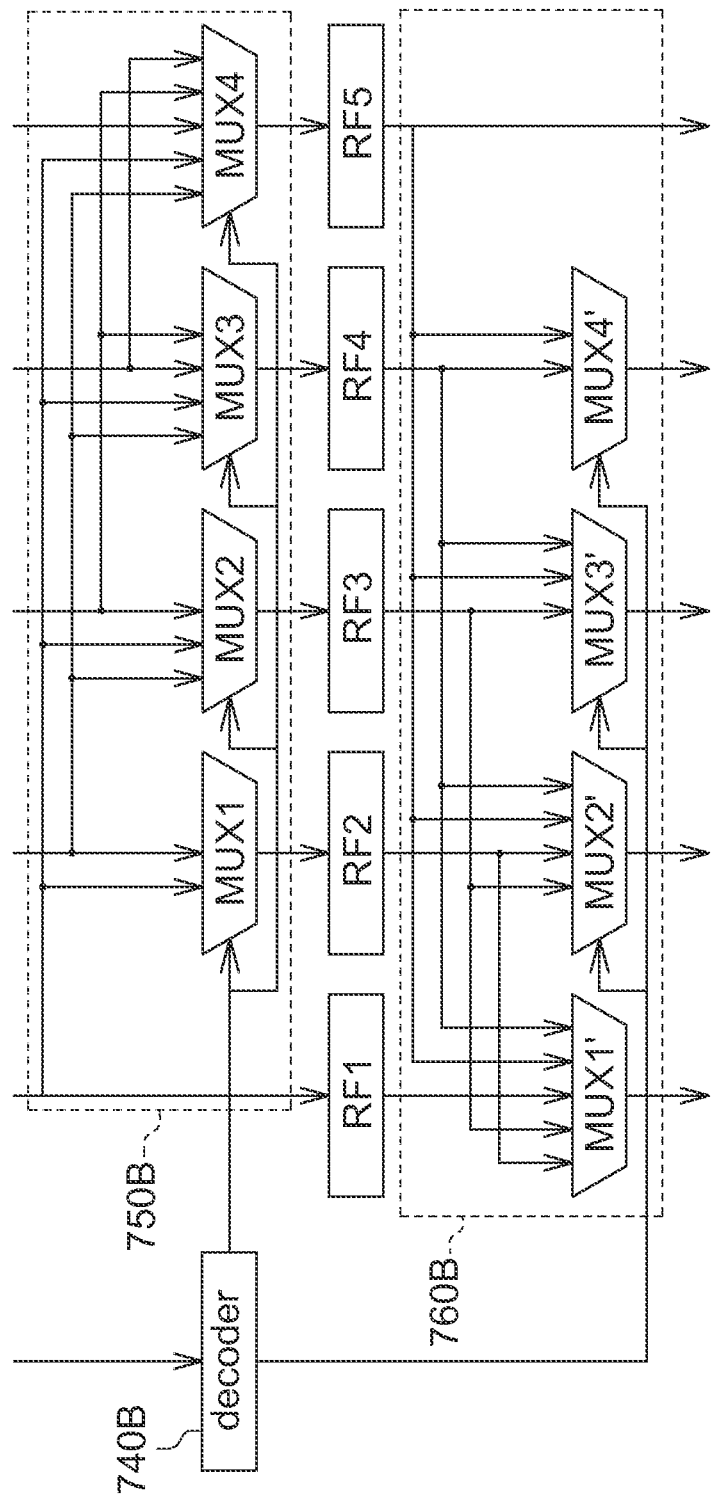
FIG. 7B shows a circuit structure of a read operand stage for resolving register conflict according to an exemplary embodiment.
Figure 8A:
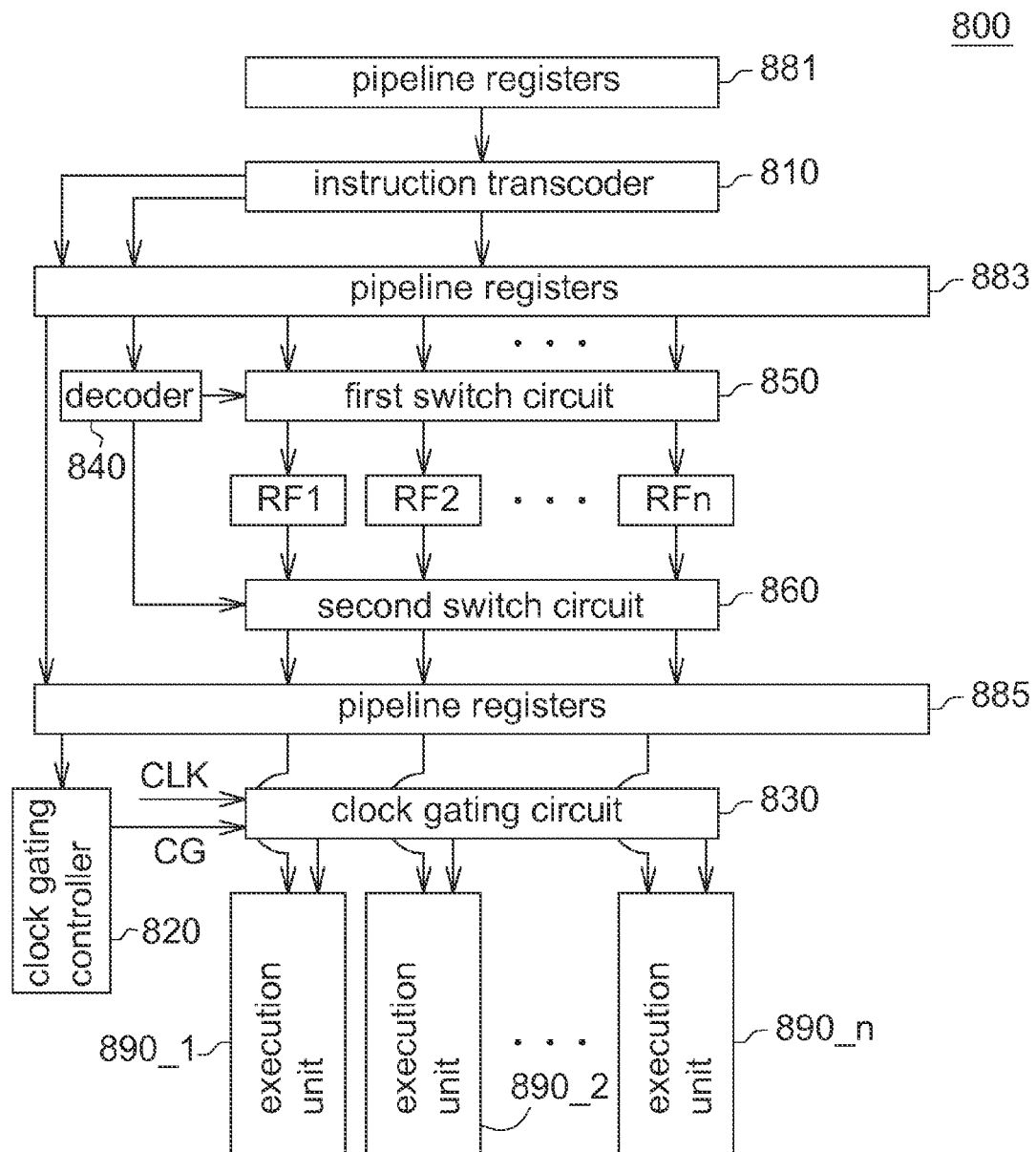
FIG. 8A shows a partial block diagram of a VLIW processor according to an exemplary embodiment.
Figure 8B:
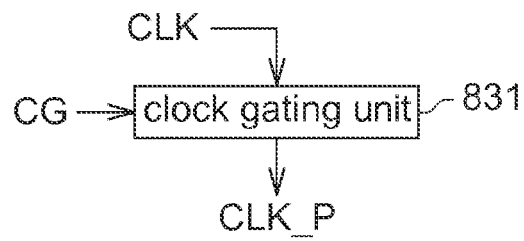
FIG. 8B shows an exemplary embodiment of a clock gating unit.
Figure 9A:
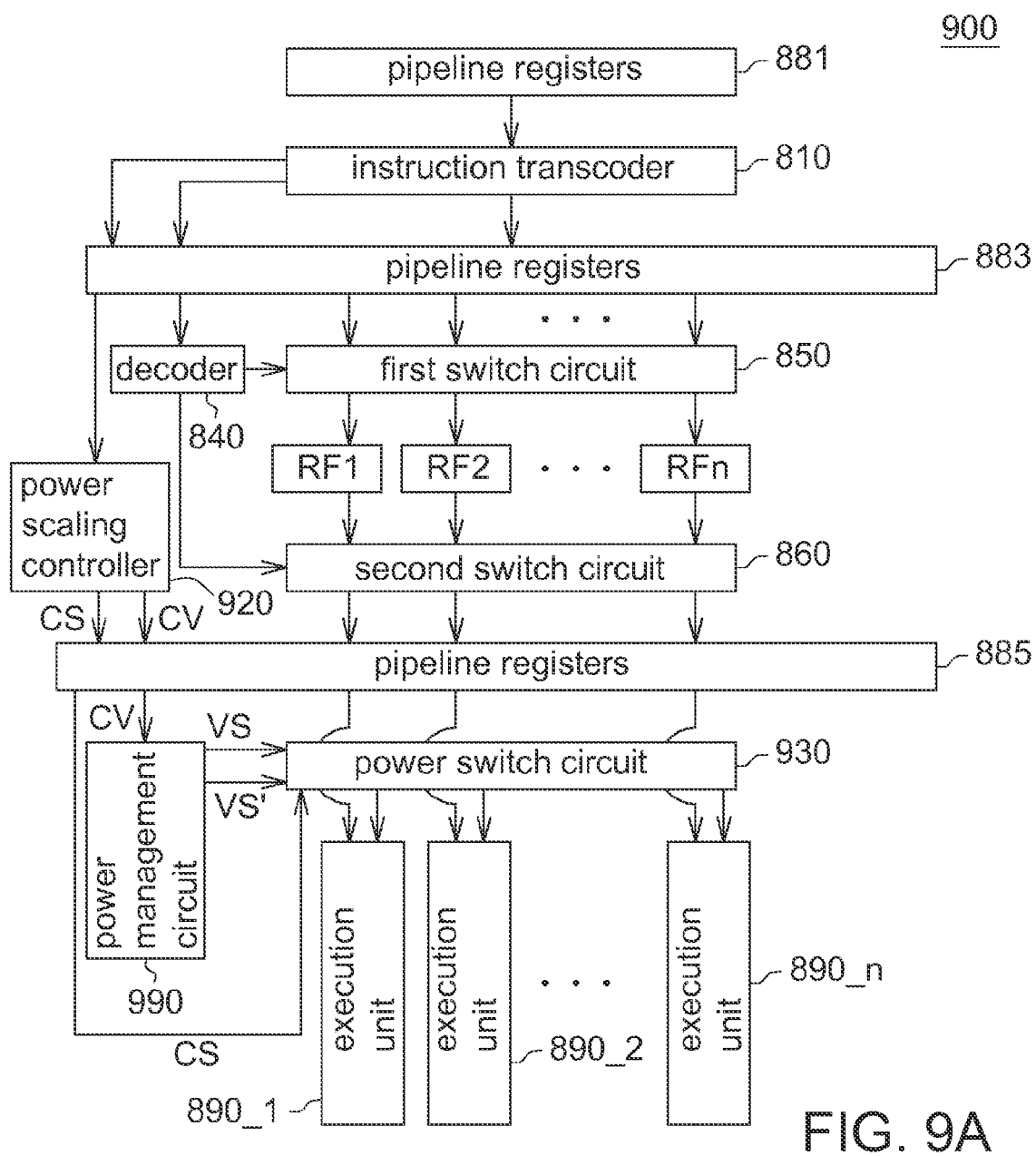
FIG. 9A shows a partial block diagram of a VLIW processor according to another exemplary embodiment.

FIG. 7B shows a circuit structure of a read operand stage for resolving register conflict situation according to an exemplary embodiment. In FIG. 7B, five register files RF1-RF5 correspond to a VLIW processor with five execution units such as the VLIW processor with power management as illustrated in the pipeline architecture of FIG. 1A or the VLIW processor as illustrated in FIG. 8A or 9A, and the transcoding is implemented by shifting the NOP instructions to the right. In addition, a control circuit, realized by such as a decoder 740B, controls the switch circuits 750B and 760B according to the instruction slot number and the value by which the instruction slot is shifted, such as the parameters S_NUM and S_NUM-S_R, to resolve the register conflict situation. In FIG. 7B, the register address and data from a previous stage and corresponding to the instruction slot are coupled to the address input signal terminal of the registers file RF1-RF5 via the switch circuit 750B, and the data output signal terminals of the register files RF1-RF5 are coupled to a next stage via another switch circuit 760B. In other words, the data output signal terminals of the register files RF1-RF5 are respectively coupled to the execution units 1-5. The switch circuit 750B includes a number of multiplexers such as multiplexers MUX1-MUX4. The multiplexer MUX1 selectively receives the address input signal outputted from the corresponding instruction slot 2 and the address input signal outputted from the instruction slot 1, wherein the instruction slot 1 is located to the left of the instruction slot 2. The coupling methods of the multiplexers MUX2-MUX4 can be obtained in the same manner. The switch circuit 760B includes multiplexers MUX1'-MUX4', and the data output signal terminals of the register files RF1-RF4 are coupled to the multiplexers MUX1'-MUX4'. The multiplexer MUX4' selectively receives the data output signal outputted the corresponding instruction slot 4 and the data output signal outputted from the instruction slot 5, wherein the instruction slot 5 is located to the right of the instruction slot 4. The coupling methods of the multiplexers MUX3'-MUX1' can be implemented in the same manner. To the contrary, if the transcoding is for shifting the NOP instruction(s) to the left, the above implementations will be done in an opposite way. In other embodiments, the above principles can also be applied to the VLIW processor with n execution units such as the VLIW processor with power management as illustrated in the pipeline architecture of FIG. 1A.

Figure 7C:
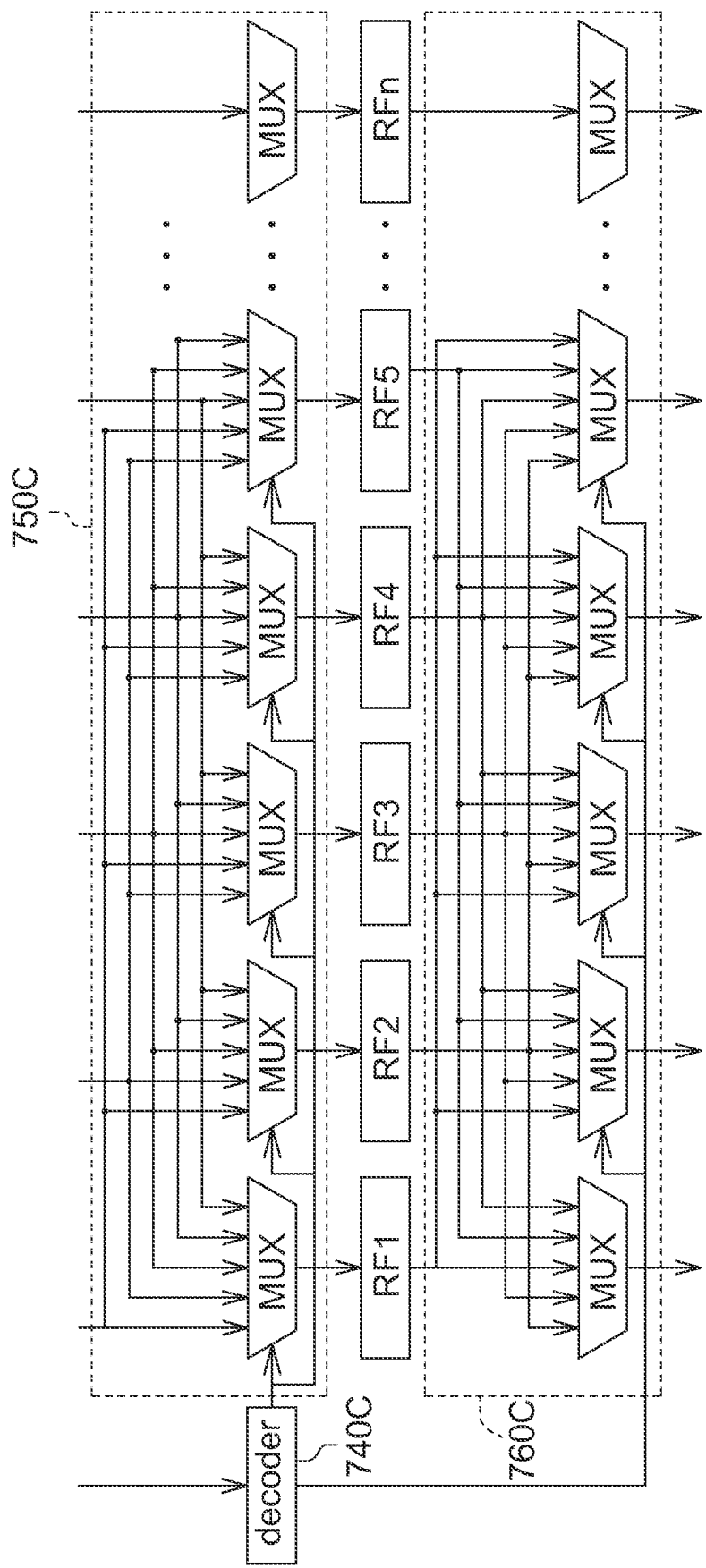
FIG. 7C shows a circuit structure of a read operand stage for resolving register conflict according to another exemplary embodiment.

FIG. 7C shows a circuit structure of a read operand stage for resolving register conflict according to another embodiment. FIG. 7C shows a VLIW processor with n execution units as the circuit structure of a read operand stage. The circuit of FIG. 7C is different from that of FIG. 7B is that: the address input signal terminals of all register files R1, R2-Rn can selectively receive the register address and data of any instruction slot from a previous stage by way of the switch circuits 750C and 760C. The data output signal terminal of all register files R1-Rn can be selectively coupled to the execution units corresponding to any instruction slot of any next stage. Thus, the method of shifting the NOP instructions of the transcoding stage can also be used to the VLIW processor using the read operand stage circuit structure of FIG. 7C for positioning the NOP instructions around the left, the right, the middle or the two sides, or for selectively setting the transcoding method or can be changed according to condition to be set. The decoder 740C can control the switch circuits 750C and 760C according to the way of shifting NOP instructions at the transcoding stage, the instruction slot number and the value by which the instruction slot is shifted, such as the parameter S_NUM and S_NUM-S_R, to resolve the register conflict situation. The implementation is similar to that disclosed in FIGS. 7A and 7B, and is not repeated here.

Configuration of VLIW Processor

Based on the embodiment of a pipeline architecture of a VLIW processor illustrated in FIG. 1A, an exemplary embodiment of a VLIW processor with power management is provided below. FIG. 8A shows a partial block diagram of a VLIW processor according to an exemplary embodiment. Referring to FIG. 1A. As illustrated in FIG. 8A, the VLIW processor 800 includes an instruction transcoding stage 110, a read operand stage 30 and an execution stage 40. The instruction transcoding stage 110 is coupled between the pipeline registers 881 and 883. The read operand stage 30 is coupled between the pipeline registers 883 and 885. The execution stage 40 is disposed after the pipeline register 885.

The instruction transcoding stage 110 of FIG. 1A is realized by an instruction transcoder 810. Like the instruction transcoder 210 or 500, the instruction transcoder 810 transcodes the input instruction package generated by the instruction decoding stage 20 into a transcoded instruction package.

The power reduction controller 120 of FIG. 1A can be realized by a clock gating controller 820 and a clock gating circuit 830 for performing power management. The clock gating controller 820 outputs a clock gating signal CG to control the clock gating circuit 830 according to the output of the instruction transcoder 810 such as the valid bits {1|1|1|1|0|0} of the transcoded instruction package. The clock gating circuit 830 receives a clock signal CLK and selectively provides a clock to the corresponding execution units 890_1 to 890_n according to the clock gating signal CG.

The clock gating circuit 830 includes many clock gating units 831 as illustrated in FIG. 6, wherein each clock gating unit 831 corresponds to n execution units 890_1 to 890_n, wherein the clock gating signal CG can individually transmit an enabling signal to corresponding clock gating control unit 831 in many different ways, such as according to the instruction slot corresponding to the bits of the valid bits {1|1|1|1|0|0}. The clock gating control unit 831, realized by a logic circuit, determines whether to output a clock signal CLK_P to the corresponding execution unit. For example, when the instruction slot corresponds to an NOP instruction, the clock signal CLK_P is disabled as 0, so as to reduce power consumption.

To avoid the register conflict situation, the read operand stage 30 of the VLIW processor 800, which adopts a circuit structure as illustrated in FIG. 7A, 7B or 7C, includes a decoder 840, a first switch circuit 850 and a second switch circuit 860 and n register files RF1-RFn. The first switch circuit 850 or the second switch circuit 860 can be realized by such as the switch circuit 750B, 750C, 760B or 760C illustrated in FIG. 7B or 7C. The decoder 840 controls via which instruction slot is the address input signal inputted to the register file and to which execution unit is the read data sent according to the output of the instruction transcoder 810, such as two parameter {S_NUM, S_NUM-S_R} of the instruction slot.

FIG. 9A shows a partial block diagram of a VLIW processor 900 according to another embodiment. As illustrated in FIG. 9A, the stages of the pipeline structure of the VLIW processor 900 are the same as those illustrated in FIG. 8A. The VLIW processor 900 is different from the VLIW processor 800 in that: the power reduction controller 120 of FIG. 1A is realized by a power scaling controller 920, a power switch circuit 930 and a power management circuit 990 for performing power management by selectively controlling (such as reducing or turning off) the operating voltage provided to the execution unit like the embodiment of FIG. 3, 4A or 4B.

The power scaling controller 920 can be used for implementing the power management method of FIGS. 4A and 4B. The power scaling controller 920, according to the output of the instruction transcoder 810 such as the valid bits {1|1|1|1|0|0} of the transcoded instruction package, outputs a power switch control signal CS and a power management circuit control signal CV following the determination as illustrated in FIG. 4A. The power switch control signal CS is transmitted to the power switch circuit 930 for controlling different voltage levels selected by the power switch circuit 930 to be outputted to corresponding execution units 890_1 to 890_n. The power management circuit control signal CV is transmitted to the power management circuit 990 for controlling the power management circuit 990 to generate and provide voltages of different voltage levels to the power switch circuit 930.

Figure 9B:
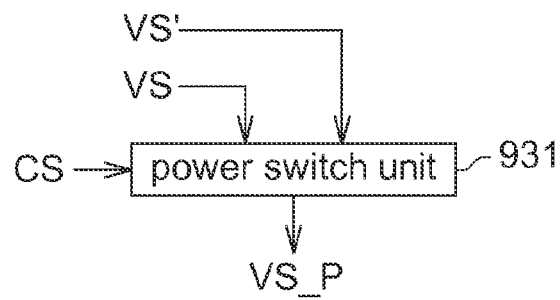
FIG. 9B shows an exemplary embodiment of a power switch unit.

The power switch circuit 930 includes many power switch units 931 as illustrated in FIG. 9B, wherein each corresponds to n execution units 890_1 to 890_n, receives a voltage VS or VS' outputted from the power management circuit 990, and selectively outputs a voltage VS_P to the corresponding execution unit. The voltage VS is lower than the original operating voltage VS'. The power switch control signal CS can individually transmit a power switch control signal CS to the corresponding power switch unit 931 in different ways such as according to the instruction slot (FIG. 3) corresponding to the bits of the valid bits {1|1|1|1|0|0} or according to the comparison between the number of occurrences of NOP instruction(s) and a threshold value as illustrated in FIGS. 4A and 4B. The power switch unit 931, realized by a logic circuit, a transistor or a power switch, determines whether to output the voltage VS_P to its corresponding execution unit. When corresponding to an NOP instruction, the voltage VS_P is realized by voltage VS' whose level is 0 or lower than the original operating voltage to reduce power consumption. When necessary, the voltage VS_P is boosted to the original level of operating voltage from 0 or a lower level.

The output voltage of the power management circuit 990 can be implemented in many different ways. For example, the power scaling controller 920 individually transmits a power switch control signal CS to corresponding power switch unit 931 according to the comparison between the number of occurrences of NOP instructions and a threshold value, so that the power management circuit 990 generates different operating voltages VS and VS' corresponding to the execution units 890_1-890_n. By providing the power switch control signal CS to each power switch unit 931, the power scaling controller 920 selects an appropriate operating voltage (such as voltage VS or voltage VS') to reduce power consumption.

The power management circuit 990 can be realized by a power management integrated circuit such as an AC-DC converter, a voltage regulator or a dynamic voltage scaling or other loop of power management.

Besides, the execution unit includes a computation and logic unit, a bit processing unit, a data transmitting unit and an address generation unit. However, the implementation of the execution units of the VLIW processor is not limited thereto. Any pipeline architecture conforming to the above VLIW processors with instruction transcoding stage and any VLIW processors capable of performing power management on an execution stage according to the result of transcoded instruction can be regarded as embodiments of the disclosure.

The above disclosure relates to embodiments of a VLIW processor and an apparatus with power management and a method of power management therefor. Power reduction control is performed on the execution units of the VLIW processor corresponding to NOP instruction(s) by performing transcoding process to the instruction package for dividing or positioning the valid instruction(s) and NOP instruction(s) of the instruction package.

By analyzing some application programs such as the decoding or encoding H.264, JPEG, MP3, MPEG2, WMA of multimedia on an ordinary VLIW processor, the NOP instructions will amount about 49% to 74% of the overall instruction. If the VLIW processor with five execution units realizes power management according to an exemplary embodiment disclosed above, the power consumption of one or two of the execution units can be reduced so as to reduce the overall power consumption of the VLIW processor. Thus, the VLIW processor with power management is adaptable to electronic products such as portable or mobile device to meet the application and power restriction of electronic products. The VLIW processor is beneficial to electronic products in increasing the computation capabilities of electronic products, reducing the overall hardware complexity, reducing power consumption under different power saving modes or dynamic situations.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management apparatus, for use in a very long instruction word (VLIW) processor, wherein the power management apparatus comprises:
    an instruction transcoder for rearranging valid instruction(s) and no operation (NOP) instruction(s) of an input instruction package to output a transcoded instruction package, wherein the transcoded instruction package by the rearrangement has its NOP instruction(s) corresponding to at least one execution unit, which is to be placed in power reduction state, of a VLIW processor; and
    a power reduction controller for selectively performing power reduction control on the at least one execution unit corresponding to at least one NOP instruction of the transcoded instruction package, according to the transcoded instruction package.

2. The power management apparatus according to claim 1, wherein the instruction transcoder checks relationship between positions of the valid instruction(s) and NOP instruction(s) of the input instruction package, and rearranges the positions of the valid instruction(s) and NOP instruction(s) of the input instruction package to output the transcoded instruction package.

3. The power management apparatus according to claim 2, wherein the instruction transcoder comprises:
    an instruction shift determination device for checking the relationship between the positions of the valid instruction(s) and NOP instruction(s) of the input instruction package; and
    an instruction rearrangement device for performing shift operation on the positions of the valid instruction(s) and NOP instruction(s) of the input instruction package, according to a result of positional relationship obtained by the instruction shift determination device through checking, to output the transcoded instruction package.

4. The power management apparatus according to claim 2, wherein the result of positional relationship obtained through checking comprises a corresponding shift value and an instruction slot number in the input instruction package for each valid instruction of the input instruction package.

5. The power management apparatus according to claim 3, wherein the instruction shift determination device, according to a sequence, checks whether an instruction of the input instruction package is an NOP instruction, and accumulates the number of NOP instruction(s), and when an instruction is determined as a valid instruction, the accumulated number of NOP instruction(s) is a shift value of the valid instruction; the instruction rearrangement device, according to the shift value, performs a shift operation on the valid instruction for positioning the valid instruction around a position in the transcoded instruction package.

6. The power management apparatus according to claim 5, wherein the sequence that the instruction shift determination device follows starts from an instruction of an end of the input instruction package to an instruction of another end of the input instruction package consecutively.

7. The power management apparatus according to claim 5, wherein the sequence that the instruction shift determination device follows starts from an instruction at an end of the input instruction package to an instruction of the input instruction package consecutively or starts from an instruction of the input instruction package to an instruction at an end of the input instruction package consecutively.

8. The power management apparatus according to claim 1, wherein the power reduction controller, according to the transcoded instruction package, selectively performs clock gating control to reduce power consumption for the at least one execution unit corresponding to the at least one NOP instruction of the transcoded instruction package.

9. The power management apparatus according to claim 1, wherein the power reduction controller, according to the transcoded instruction package, selectively provides a voltage lower than an original operating voltage to the at least one execution unit corresponding to the at least one NOP instruction of the transcoded instruction package to reduce power consumption.

10. The power management apparatus according to claim 1, wherein the power reduction controller accumulates the number of the NOP instruction(s) of the transcoded instruction package corresponding to at least one execution unit, which is to be placed in power reduction state; if the accumulated number satisfies a threshold value, the power reduction controller selectively provides a voltage lower than an original operating voltage to the at least one execution unit, which is to be placed in power reduction state, to reduce power consumption.

11. The power management apparatus according to claim 1, wherein the instruction transcoder further outputs an instruction validation information to indicate whether each instruction slot of the transcoded instruction package is a valid instruction or an NOP instruction; the power reduction controller selectively performs power reduction control according to the instruction validation information.

12. A power management method, for use in a VLIW processor, wherein the power management method comprises:
rearranging valid instruction(s) and no operation (NOP) instruction(s) of an input instruction package to output a transcoded instruction package, wherein the transcoded instruction package by the rearrangement has its NOP instruction(s) corresponds to at least one execution unit, which is to be placed in power reduction state, of a VLIW processor; and
selectively performing power reduction control on the at least one execution unit corresponding to the at least one NOP instruction of the transcoded instruction package, according to the transcoded instruction package.

13. The power management method according to claim 12, wherein the rearrangement step comprises:
checking the input instruction package to obtain relationship between positions of the valid instruction(s) and NOP instruction(s) of the input instruction package; and
performing a shift operation on the positions of the valid instruction(s) and NOP instruction(s) of the input instruction package according to the result of positional relationship obtained through checking to output the transcoded instruction package.

14. The power management method according to claim 13, wherein the result of positional relationship obtained through checking comprises a corresponding shift value and an instruction slot number in the input instruction package for each valid instruction of the input instruction package.

15. The power management method according to claim 13, wherein:
the step of checking the input instruction package comprises:
checking whether an instruction of the input instruction package is an NOP instruction(s) according to a sequence, and accumulating the number of NOP instruction(s), wherein when an instruction is determined as a valid instruction, the accumulated number of NOP instruction(s) is a shift value of the valid instruction; and
the step of performing shift operation comprises:
performing a shift operation to the valid instruction according to the shift value for positioning the valid instruction around a position in the transcoded instruction package.

16. The power management method according to claim 15, wherein the sequence starts from an instruction at an end of the input instruction package to an instruction at another end of the input instruction package consecutively.

17. The power management method according to claim 15, wherein the sequence starts from an instruction at an end of the input instruction package to an instruction of the input instruction package consecutively or starts from an instruction of the input instruction package to an instruction at an end of the input instruction package consecutively.

18. The power management method according to claim 12, wherein the step of selectively performing power reduction control comprises:
selectively performing clock gating control on the at least one execution unit corresponding to the at least one NOP instruction of the transcoded instruction package according to the transcoded instruction package to reduce the power consumption of the at least one execution unit.

19. The power management method according to claim 12, wherein the step of selectively performing power reduction control comprises:
selectively providing a voltage lower than an original operating voltage to the at least one execution unit corresponding to the at least one NOP instruction of the transcoded instruction package according to the transcoded instruction package to reduce power consumption.

20. The power management method according to claim 12, wherein the step of selectively performing power reduction control comprises:
accumulating the number of the NOP instruction(s) of the transcoded instruction package corresponding to at least one execution unit, which is to be placed in power reduction state; and
selectively providing a voltage lower than an original operating voltage to the at least one execution unit, which is to be placed in power reduction state, to reduce power consumption if the accumulated number satisfies a threshold value.

21. The power management method according to claim 12, wherein the rearrangement step further outputs an instruction validation information to indicate whether each instruction slot of the transcoded instruction package is a valid instruction or an NOP instruction; and in the step of selectively performing power reduction control, power reduction control is selectively performed according to the instruction validation information.

22. A very long instruction word (VLIW) processor, comprising:
a read operand stage;
a plurality of execution units coupled to the read operand stage;
an instruction transcoder, wherein the read operand stage is coupled between the instruction transcoder and the execution units, the instruction transcoder rearranges valid instruction(s) and no operation (NOP) instruction(s) of an input instruction package to output a transcoded instruction package, which is executed by the execution units, and the transcoded instruction package by the rearrangement has its NOP instruction(s) corresponding to at least one of the execution units, which is to be placed in power reduction state; and
a power reduction controller for selectively performing power reduction control on the at least one execution unit corresponding to at least one NOP instruction of the transcoded instruction package according to the transcoded instruction package.

23. The VLIW processor according to claim 22, wherein the instruction transcoder checks relationship between positions of the valid instruction(s) and NOP instruction(s) of the input instruction package, and rearranges the positions of the valid instruction(s) and NOP instruction(s) of the input instruction package to output the transcoded instruction package.

24. The VLIW processor according to claim 23, wherein the result of positional relationship obtained through checking comprises a corresponding a shift value and an instruction slot number in the input instruction package for each valid instruction of the input instruction package.

25. The VLIW processor according to claim 24, wherein the read operand stage comprises:

a first switch circuit;

a plurality of register files coupled to the first switch circuit, wherein each register file corresponds to an execution unit;

a second switch circuit, wherein the register files is coupled between the first switch circuit and the second switch circuit; and a decoder, which, according to a result of positional relationship obtained through checking, controls the first switch circuit and the second switch circuit to transmit a corresponding register address or data of each instruction of the transcoded instruction package to one of the register files and to correspondingly transmit the data read from the one of the register files to a corresponding execution unit.

26. The VLIW processor according to claim 25, wherein when a valid instruction in an instruction slot of a previous transcoded instruction package generated by the instruction transcoder and a valid instruction in the instruction slot of a current transcoded instruction package generated by the instruction transcoder both use a same register file, the decoder, according to the corresponding instruction slot number of the valid instruction of the current transcoded instruction package and the shift value, controls the first switch circuit and the second switch circuit and makes the execution unit corresponding to the valid instruction of the current transcoded instruction package change to access another register file.

27. The VLIW processor according to claim 23, wherein the instruction transcoder comprises:

an instruction shift determination device for checking the relationship between the positions of the valid instruction(s) and NOP instruction(s) of the input instruction package; and an instruction rearrangement device for performing shift operation to the positions of the valid instruction(s) and NOP instruction(s) of the input instruction package according to a result of positional relationship obtained by the instruction shift determination device through checking, to output the transcoded instruction package.

28. The VLIW processor according to claim 27, wherein the instruction shift determination device, according to a sequence, checks whether an instruction of the input instruction package is an NOP instruction and accumulates the number of NOP instruction(s), and when an instruction is determined as a valid instruction, the accumulated number of NOP instruction(s) is a shift value of the valid instruction; the instruction rearrangement device, according to the shift value, performs a shift operation on the valid instruction for positioning the valid instruction around a position in the transcoded instruction package.

29. The VLIW processor according to claim 28, wherein the sequence that the instruction shift determination device follows starts from an instruction at an end of the input instruction package to an instruction at another end of the input instruction package consecutively.

30. The VLIW processor according to claim 28, wherein the sequence that the instruction shift determination device follows starts from an instruction at an end of the input instruction package to an instruction of the input instruction package consecutively or starts from an instruction of the input instruction package to an instruction at an end of the input instruction package consecutively.

31. The VLIW processor according to claim 22, wherein the power reduction controller, according to the transcoded instruction package, selectively performs clock gating control on the at least one execution unit corresponding to the at least one NOP instruction of the transcoded instruction package to reduce power consumption.

32. The VLIW processor according to claim 22, wherein the power reduction controller, according to the transcoded instruction package, selectively provides a voltage lower than an original operating voltage to the at least one execution unit corresponding to the at least one NOP instruction of the transcoded instruction package to reduce power consumption.

33. The VLIW processor according to claim 22, wherein the power reduction controller accumulates the number of the NOP instruction(s) of the transcoded instruction package corresponding to at least one execution unit, which is to be placed in power reduction state; if the accumulated number satisfies a threshold value, then the power reduction controller selectively provides a voltage lower than an original operating voltage to the at least one execution unit, which is to be placed in power reduction state, to reduce power consumption.

34. The VLIW processor according to claim 22, wherein the instruction transcoder further outputs an instruction validation information to indicate whether each instruction slot of the transcoded instruction package is a valid instruction or an NOP instruction; the power reduction controller selectively performs power reduction control according to the instruction validation information.

* * * * *